United States Patent [19]
Nashimoto

[11] Patent Number: 5,802,223
[45] Date of Patent: Sep. 1, 1998

[54] OPTICAL DEFLECTING DEVICE

[75] Inventor: Keiichi Nashimoto, Minami-ashigara, Japan

[73] Assignee: Fuji Xerox Co., Ltd., Tokyo, Japan

[21] Appl. No.: 667,864

[22] Filed: Jun. 20, 1996

[30] Foreign Application Priority Data

Jun. 21, 1995 [JP] Japan .................... 7-176939

[51] Int. Cl.[6] .................................................. G02F 1/295
[52] U.S. Cl. .................... 385/8; 385/2; 385/36; 385/40
[58] Field of Search .................... 385/8, 10, 2, 14, 385/36, 40, 122; 359/328

[56] References Cited

U.S. PATENT DOCUMENTS 4,973,121  11/1990  Brophy et al. ................ 385/10
5,359,452  10/1994  Nitanda et al. .............. 385/122 X

FOREIGN PATENT DOCUMENTS 52-68307    6/1977   Japan .
62-47627    3/1987   Japan .
B2-63-64765 12/1988  Japan .

OTHER PUBLICATIONS

IEEE Transactions on Circuits and Systems, vol. CAS–26, No. 12. Dec. 1979, "Guided–Wave Acoustooptic Bragg Modulators for Wide–Band Integrated Optic Communications and Signal Proceeding", Chen S. TSAI, pp. 1072–1098.

Optical Electronics, 4th Ed. (New York, Rinehart and Winston, 1991), FT95–00086, A. Yariv, pp. 336–339, No Month.

Journal of Lightwave Technology, vol. 12, No. 8, Aug. 1994, "Guided–Wave Electro–Optic Beam Deflector Using Domain Reversal in LiTaO3", Qibiao Chen et al., pp. 1401–1403.

Department of Electronics, Faculty of Engineering, Osaka University, OQE85–177, Mar. 17, 1986, "Integrated Acoustooptic Printer Head", Nobuharu Nozaki et al., pp. 43–48.

Miyanodai Technology Development Center, Fuji Photo Film Co., Ltd., OQE88–139, Feb. 20, 1989, "A Waveguide–Type Acousto–Optic Wide Angle Deflector", Masami Hatori et al., pp. 9–15.

Primary Examiner—Phan T. H. Palmer
Attorney, Agent, or Firm—Oliff & Berridge, PLC

[57] ABSTRACT

An optical deflecting device of optical waveguide type comprising: a conductive or semi-conductive monocrystalline substrate, or a monocrystalline substrate having a conductive or semi-conductive, epitaxial or oriented film provided on the surface thereof; an optical waveguide comprising an epitaxial or oriented ferroelectric film provided on the surface of the monocrystalline substrate; and an upper electrode disposed on top of the optical waveguide. In the optical deflecting device, the conductive or semi-conductive monocrystalline substrate, or the conductive or semi-conductive, epitaxial or oriented film provided on the monocrystalline substrate acts as a lower electrode. The laser beam introduced into the optical waveguide is deflected by applying a voltage between the upper electrode and the lower electrode.

20 Claims, 10 Drawing Sheets

OPTICAL DEFLECTING DEVICE

FIELD OF THE INVENTION

The present invention relates to an optical deflecting device which is used in a laser printer, a digital copier, or a facsimile and is equipped with electrodes for deflecting an optical beam traveling in an optical waveguide by means of the electro-optical effect.

BACKGROUND OF THE INVENTION

A representative laser-beam optical scanner used in a laser-beam printer, a digital copier or a facsimile comprises a rotating mirror with multiple sides, i.e., a so-called polygon mirror, for deflecting a beam emitted from a gas laser or a semiconductor laser, and an f-θ lens for converging the laser beam reflected from the rotating polygon mirror on an image-forming plane of, e.g., a photoreceptor, in such a way as to achieve uniform linear motion. This type of optical scanner using the polygon mirror has inferior durability and brings about noise because of high-speed rotation of the polygon mirror caused by a motor. Further, an optical scanning rate is limited by the number of rotations of the motor.

For a solid-state laser-beam optical deflector, there is an optical deflecting device which utilizes the acousto-optic effect. Of the optical deflecting devices of this type, an optical waveguide device shows a lot of potential (C. S. Tsai, IEEE Trans. Circuits and Syst. Vol. CAS-26(1979)1072). The application of the optical waveguide to printers, and the like, has been studied to solve the disadvantages of the laser-beam optical scanner using the polygon mirror; as described in Nozaki et al, Technical Research Report, OQE85-177 (1986) 43, the Institute of Electronic Information Communications, and Hatori et al, Technical Research Report, OQE88-13 (1989) 9, the Institute of Electronic Information Communications. As disclosed in, e.g., Unexamined Published Japanese Patent Application. No. Sho-52 (1977)-68307 and Examined Japanese Patent Publication No. Sho-63(1988)-64765, such type of an optical waveguide deflecting device comprises an optical waveguide made of $LiNbO_3$, ZnO or the like; coupling means for guiding a laser beam into the optical waveguide (i.e. for causing the laser beam to enter the optical waveguide); a comb-shaped electrode for exciting a surface acoustic wave to deflect the optical beam traveling through the optical waveguide by means of the acousto-optical effect; and means for outputting the deflected laser beam from the optical waveguide. In addition, the optical waveguide deflecting device is provided with a thin-film lens, as required. The optical waveguide deflecting device has several advantages such as noiseless, high reliability and reduced size.

The optical waveguide deflecting device deflects the optical beam utilizing the acousto-optical effect, and the surface acoustic wave is generally excited by digital modulation. However, the digital modulation has such a disadvantage that a practical laser-beam scanning rate usable for a laser printer, a digital copier or a facsimile cannot be achieved. Analog modulation which is faster than the digital modulation is also known. However, the laser beam modulated by the analog modulating method is collected, which in turn makes it impossible to achieve the practical profile of the laser beam for use with a laser printer, a digital copier, or a facsimile. Further, for the case of analog modulation, a low response speed may present a problem depending on the applications.

A prism type optical deflecting device has also been known which uses a material having the electro-optical effect that is faster in modulation speed than the acousto-optic effect, as described in A. Yariv, Optical Electronics, 4th ed. (New York, Rinehart and Winston, 1991) pp. 336 to 339. Bulk elements comprising ceramics or monocrystals are known as this type of device. However, the bulk element is literally bulky and requires a considerably high driving voltage, which makes it impossible to obtain a practical deflection angle.

A prism type domain reversal optical deflecting device or a prism type electrode optical deflecting device utilizing a $LiNbO_3$ monocrystalline wafer in which a Ti-diffused optical waveguide or a proton-exchanged optical waveguide is formed, is also known as disclosed in, for example, Q. Chen, et al., J. Lightwave Tech. Vol. 12 (1994) 1401, and Unexamined Published Japanese Patent Application No. Sho-62 (1987)-47627). This type of optical deflecting device requires an electrode pitch of about 0.5 mm which is equal to the thickness of the $LiNbO_3$ monocrystalline wafer. For this reason, the optical deflecting device still requires a high driving voltage. In the above described "J. Lightwave Tech." Vol. 12, pp. 1401, a deflection angle of only about 0.5° is obtained, even when a driving voltage is ±600 V. In this way, even in the case of the above described type of optical deflecting device, it is still impossible to obtain a practical deflection angle. The present invention has been achieved to solve the above described disadvantages in conventional techniques.

SUMMARY OF THE PRESENT INVENTION

An object of the present invention is to provide a waveguide optical deflecting device which permits high-speed modulation utilizing the electro-optical effect and, more particularly, to provide an optical deflecting device which provides an increased deflection angle at a low driving voltage and is generally applicable to optoelectronic devices including a laser beam deflecting device applicable to a laser printer, a digital copier and a facsimile machine, a pick-up for use with an optical disk, and an optical switch for use in optical communications and an optical computer.

The above object of the present invention has been achieved by providing an optical deflecting device comprising:

a conductive or semi-conductive monocrystalline substrate, or a monocrystalline substrate having a conductive or semi-conductive, epitaxial or oriented film provided on the surface thereof;

an optical waveguide comprising an epitaxial or oriented ferroelectric film provided on the surface of the monocrystalline substrate; and an upper electrode disposed on top of the optical waveguide.

In one embodiment, the optical waveguide has a prism-shaped polarization domain reversal area having two sides which are not parallel to each other, and the polarization domain reversal area is made to have a different refractive index from that of the other area of the optical waveguide by applying a voltage between the upper electrode and the monocrystalline substrate.

In another embodiment, the upper electrode has a prism-shaped pattern having two sides which are not parallel to each other, and the area of the optical waveguide covered with the upper electrode is made to have a different refractive index from that of the other area of the optical waveguide by applying a voltage between the upper electrode and the monocrystalline substrate.

In further another embodiment, the conductive or semi-conductive monocrystalline substrate, or the conductive or semi-conductive, epitaxial or oriented film provided on the monocrystalline substrate comprises an oxide having a refractive index smaller than that of the optical waveguide.

In still another embodiment, the optical deflecting device further comprises a cladding layer interposed between the upper electrode and the optical waveguide, the cladding layer having a refractive index smaller than that of the optical waveguide.

In a still further embodiment, the upper electrode comprises an oxide having a refractive index smaller than that of the optical waveguide.

The optical deflecting device of the present invention generally further comprises:

a light source for emitting a laser beam; and coupling means for introducing the laser beam into the optical waveguide.

In the present invention, the conductive or semi-conductive monocrystalline substrate, or the conductive or semi-conductive, epitaxial or oriented film provided on the monocrystalline substrate acts as a lower electrode. The laser beam introduced into the optical waveguide is deflected by applying a voltage between the upper electrode and the lower electrode.

The above and other objects and features of the present invention will be more apparent from the following description taken in conjunction with the accompanying drawing.

DETAILED DESCRIPTION OF THE INVENTION

Figure 1:
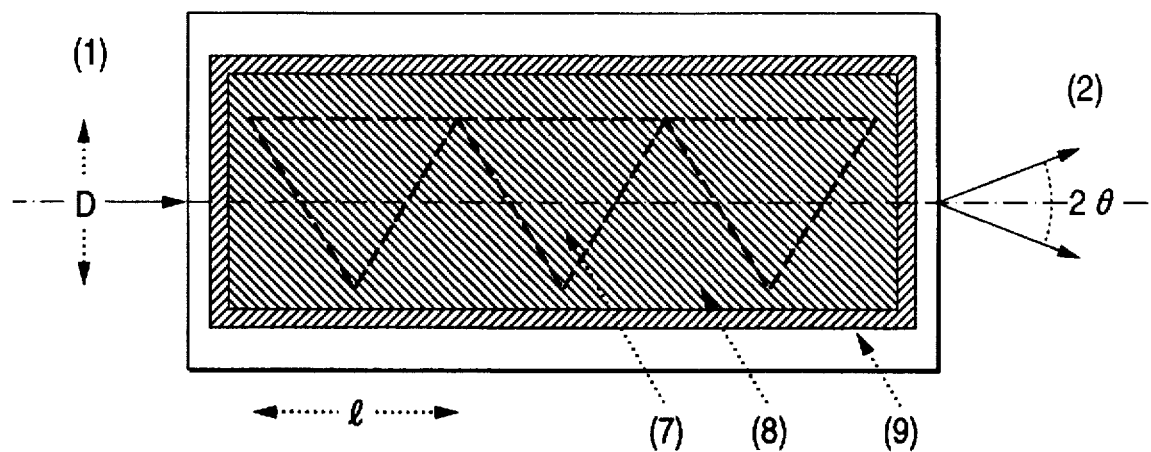
FIG. 1(a) is a top view of a conventional optical waveguide prism deflection device.
FIG. 1(b) is a cross-sectional view of the conventional optical waveguide prism deflection device.
Figure 1:
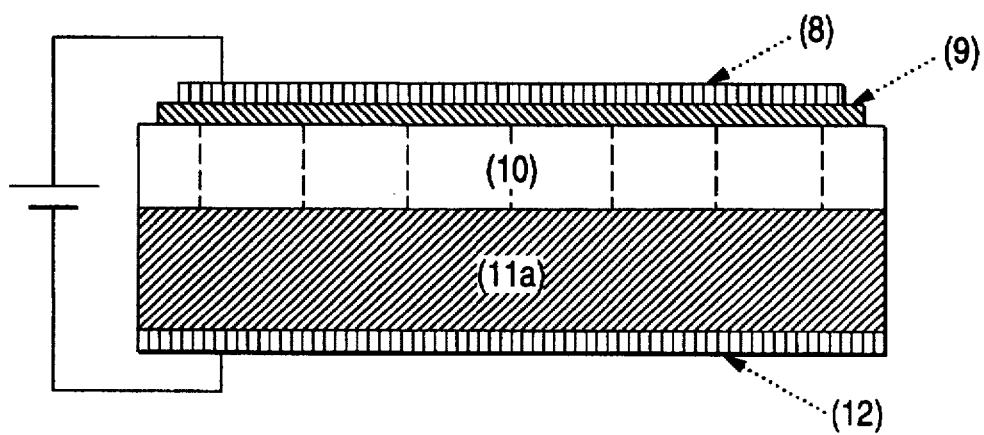

Examples of material of the ferroelectric thin film for use in the optical waveguide include $ABO_3$ type perovskite oxides such as $BaTiO_3$, $PbTiO_3$, $Pb_{1-x}La_x(Zr_yTi_{1-y})_{1-x/4}O_3$ (where it becomes PZT, PLT, or PLZT depending on the values of X and Y), $Pb(Mg_{1/3}Nb_{2/3})O_3$ and $KnbO_3$, as tetragonal, rhombic and pseudo cubic system oxides, and ferroelectric substances represented by $LiNbO_3$ and $LiTaO_3$, as hexagonal substance; tungsten bronze oxides such as $Sr_xBa_{1-x}Nb_2O_6$ and $Pb_xBa_{10x}Nb_2O_6$; $Bi_4Ti_3O_{12}$, $Pb_2KNb_5O_{15}$ and $K_3Li_2Nb_5O_{15}$; and substituted derivatives thereof.

Examples of the upper electrode include metallic electrodes made of, for example, Pt and Al, and transparent oxide electrodes having a refractive index smaller than that of the optical waveguide, such as ITO. Specific examples of the upper electrode include, for example, ITO, Al-doped ZnO and $In_2O_3$. A cladding layer having a refractive index smaller than that of the optical waveguide may be interposed between the optical waveguide and the upper electrode. In the case where the cladding layer is formed, the upper electrode may be made of arbitrary materials. However, it is desirable that the upper electrode be made of transparent oxide electrodes such as ITO which do not lead to an increase in a driving voltage.

In the present invention, the conductive or semi-conductive monocrystalline substrate, or the conductive or semi-conductive, epitaxial or oriented thin film formed on the monocrystalline substrate preferably comprises a material selected from oxides having a refractive index smaller than that of the optical waveguide, such as Nb-doped $SrTiO_3$, Al-doped ZnO, $In_2O_3$, $RuO_2$, $BaPbO_3$, $SrRuO_3$, $YBa_2Cu_3O_{7-x}$, $SrVO_3$, $LaNiO_3$ and $La_{0.5}Sr_{0.5}CoO_3$. It is also effective to use a metal such as Pd, Pt, Al, Au and Ag. In the case where the conductive or semi-conductive, epitaxial or oriented thin film is formed on the monocrystalline substrate, examples of the materials for the monocrystalline substrate include $SrTiO_3$, MgO, MgO/GaAs, $MgAl_2O_4$ and sapphire. Examples of the combination of the conductive or semi-conductive, epitaxial or oriented thin film and the monocrystalline substrate include, for example, Nb-doped $SrTiO_3$/$SrTiO_3$, Nb-doped $SrTiO_3$/MgO, Nb-doped $SrTiO_3$/MgO/GaAs, Nb-doped $SrTiO_3$/$MgAl_2O_4$, $In_2O_3$/MgO, $In_2O_3$/sapphire, $SrRuO_3$/$SrTiO_3$ and $SrRuO_3$/MgO. Further, it is desirable that the conductive or semi-conductive monocrystalline substrate, or the conductive or semi-conductive, epitaxial or oriented thin film be selected depending on the crystalline structure of the ferroelectric thin film constituting the optical waveguide. Preferred combination of the conductive or semi-conductive substrate (or thin film) and the ferroelectric thin film is such that the mismatch in crystal lattice constants thereof are less, crystal symmetricalness thereof are similar to each other, both are less apt to react with, or diffuse into each other. Specific examples of the preferred combination include PLZT(100) /Nb-doped $SrTiO_3$(100), $BaTiO_3$(001)/Nb-doped $SrTiO_3$ (100), PLZT(111)/Al-doped ZnO(0001), LiNbO$_3$(0001)/Al-doped ZnO(0001), LiTaO$_3$(0001)/Al-doped ZnO(0001), PLZT(111)/In$_2$O$_3$ and LiNbO$_3$(0001)/In$_2$O$_3$(111). The conductive or semi-conductive thin film or monocrystalline substrate used as the lower electrode and the upper electrode preferably has a specific resistance ranging about from $10^{-6}$ Ω·cm to $10^3$ Ω·cm. So long as the conductive or semi-conductive thin film or monocrystalline substrate has such a specific resistance to bring about a negligible voltage drop, it can be used for the lower electrode or the upper electrode. An upper or lower electrode material having appropriate carrier mobility may be selected depending on a deflection or modulation speed.

The ferroelectric thin film is generally manufactured by a vapor phase epitaxial growth or sol-gel method selected from electron beam deposition, flash deposition, ion plating, Rf-magnetron sputtering, ion-beam sputtering, laser abrasion, MBE and CVD. Alternatively, the ferroelectric thin film is generally manufactured by the solid phase epitaxial growth of a thin film formed by a wet process such as the MOD method.

Examples of the light source include one or plural lasers which emit one or plural laser beams to a thin film waveguide, or a laser array which oscillates plural laser beams. The light source may be disposed on the same monocrystalline substrate on which the optical waveguide is formed. Specific examples of the light source include a gas laser such as a He—Ne laser, a compound semiconductor laser such as an AlGaAs laser, and laser arrays thereof.

The laser beam emitted by the oscillation of laser is introduced into the optical waveguide by means of a method selected from prism coupling, butt coupling (or end coupling), grating coupling and evanescent field coupling.

Preferred examples of the thin film lens, which is disposed in the thin film waveguide as required and which shapes laser beams, include a mode index lens, a Luneburg lens, a geodesic lens, a Fresnel lens, a grating lens, etc.

Preferred examples of means for outputting the deflected laser beam from the optical waveguide include a prism coupler, a grating coupler, a focusing coupler, a SAW grating coupler, etc.

Next, the principle of the electro-optical effect of the optical deflecting device of the present invention is described below.

In general, if an electric field is applied to a certain material, polarization arises in the direction of the electric field, so that the light velocity in the direction of the electric field becomes smaller. On the assumption that the light velocity in a vacuum is "c", a refractive index is "n", and the light velocity in a medium having a dielectric constant of $\epsilon_r$ and a magnetic permeability of $\mu_r$ is $c_i$, the following expression is obtained.

$$n = c/c_i = (\epsilon_r \mu_r)^{1/2} \quad (1)$$

This leads to the electro-optical effect, where the refractive index increases in the direction of the electric field, while the refractive index decreases in the direction perpendicular to the electric field.

In the electro-optical effect, the relationship between the refractive index "n" and the electric field E is given by Equation (2) shown below.

$$n = n_0 + aE + bE^2 + cE^3 + \ldots \quad (2)$$

wherein a, b and c each represents a constant, $n_0$ represents a refractive index in the absence of an electric field. For the case of a substance having crystalline structure containing a center of symmetry, $$n = n_0 - aE + bE^2 - cE^3 + \ldots \quad (3)$$

$$n = n_0 + aE + bE^2 + cE^3 + \ldots \quad (4)$$

Equations (3) and (4) must be equal to each other. Hence, $$n = n_0 + bE^2 + \ldots \quad (5)$$

The change in the refractive index caused by the electric field is represented by the following equation, disappearing the terms having an odd index from the equation.

$$\Delta n = n_0 - n = -bE^2 - \ldots \quad (6)$$

The secondary term of Equation (6) is called the Kerr effect, and it is expressed by $$\Delta n = -1/2 R n_0^3 E^2 \quad (7)$$

wherein R represents the Kerr coefficient.

On the other hand, for the case of a substance having a crystalline structure containing no center of symmetry, the terms having an odd index remain in the equation as represented by $$\Delta n = n_0 - n = -aE - bE^2 - \ldots \quad (8)$$

The primary term in Equation (8) is called the Pockels effect, and it is expressed by $$\Delta n = -1/2 r n_0^3 E \quad (9)$$

wherein r represents the Pockels coefficient.

The Pockels effect is inherent only to substances having a crystalline structure containing no center of symmetry, i.e., a piezoelectric substance and a ferroelectric substance. Practically, if the electric field is increased, the refractive index changes such that the Kerr effect is gradually superimposed on the Pockels effect.

To utilize the above described electro-optic effect, a ferroelectric substance having a crystalline structure containing no symmetrical center, and having a high coefficient is used. Representative examples thereof include LiNbO$_3$ and PLZT. It is desirable to select materials free from memory effect from the standpoint of the I-E characteristics of the electro-optic effect. For this reason, it is practically necessary to select materials that have a narrow P-E hysteresis loop but do not have the memory effect in terms of the I-E characteristics. However, other materials may be used depending on the applications of the optical deflecting device. The coefficient matrix of the electro-optic effect is a tensor of third order.

Figure 3:
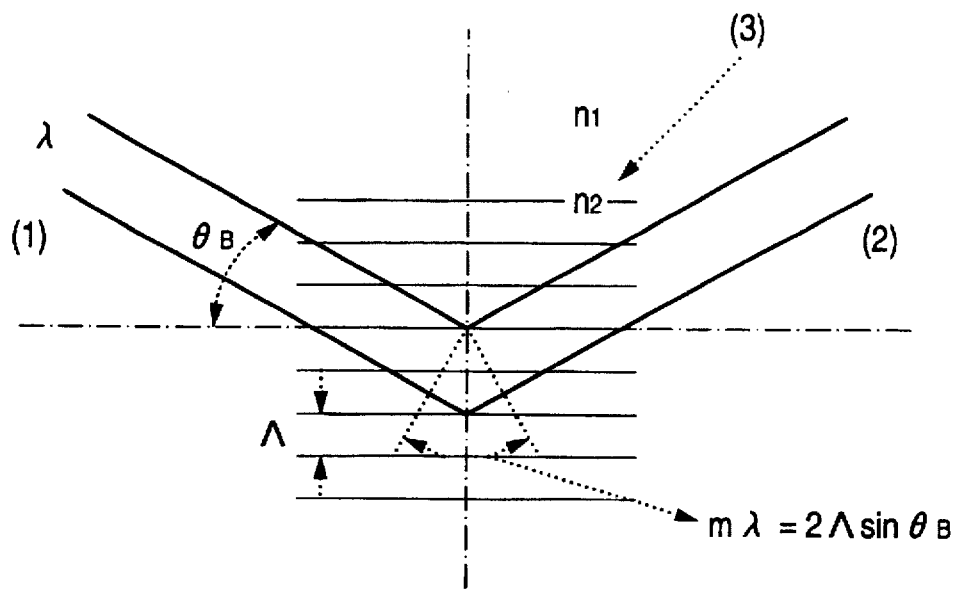
FIG. 3 is a diagrammatic illustration showing the Bragg diffraction principle due to the electro-optical effect.
Figure 4:
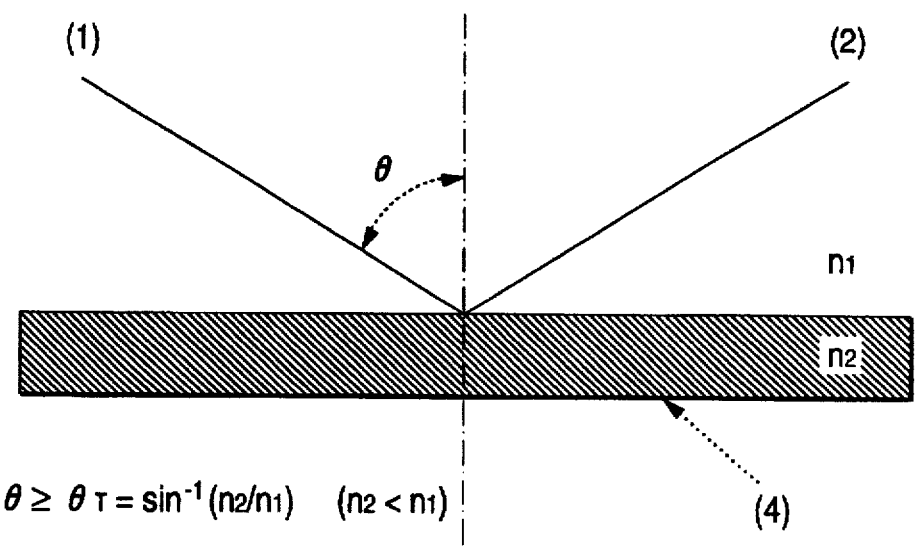
FIG. 4 is a schematic illustration showing the principle of total reflection due to the electro-optical effect.

If an electric field is locally applied to a ferroelectric substance such as a PLZT thin film, the refractive index of the area which receives the electric field decreases. As a result, the travelling direction of the laser beam can be changed in accordance with Bragg reflection as shown in FIG. 3 or in accordance with total reflection as shown in FIG. 4. Unlike an optical deflecting device utilizing the acousto-optic effect, the optical deflecting device of the present invention is not subjected to the limitation caused by the traveling time of phonons, but the electro-optic modulation is due to polarization. Therefore, the spot traveling time (the switching time) according to the present invention is considerably small, and is in the order of picoseconds.

As shown in FIG. 3, if the refractive index of the thin film is periodically changed by applying an electric field to a comb-shaped electrode in the film, the incident laser beam is subjected to Bragg reflection under the Bragg condition represented by $$m\lambda = 2\Lambda \sin \theta_B \quad (10)$$

where "m" is the order of the diffracted laser, $\lambda$ is the wavelength of the laser, $\Lambda$ designates periodic variations in the refractive index, and $\theta_B$ is a Bragg angle. To deflect (scan) the laser beam, the optical deflecting device must be provided with a plurality of electrodes, and the electrodes must be addressed so as to change the cycle of variations in the refractive index depending on a deflection angle. In FIG. 3, reference numeral 1 designates an incident laser beam, reference numeral 2 designates an outgoing laser beam, and reference numeral 3 designates a grating area caused by variations in the refractive index due to an electric field.

As shown in FIG. 4, total reflection of the laser beam at an angle of $\theta$ occurs when the condition for total reflection represented by Equation (11) is satisfied. In FIG. 4, reference numeral 4 designates the area in which the refractive index of the waveguide changes due to an electric field.

$$\theta \geq \theta_T = \sin^{-1}(n_2/n_1) \quad (11)$$

In Equation (11), $\theta_T$ is an incident angle (a critical angle), $n_1$ is a refractive index of the waveguide material, and $n_2$ is the refractive index of the area having a low refractive index. Further, $n_2 < n_1$ must be satisfied.

If the refractive index is decreased in accordance with the Pockels effect, $\Delta n = -1/2 r n_1^3$ as described above. Hence, Equation (10) becomes $$\begin{aligned}\theta_T &= \sin^{-1}(n_2/n_1) = \sin^{-1}\{(n_1 - \Delta n)/n_1\} \\ &= \sin^{-1}(1 - 1/2\, rn_1^2\, E).\end{aligned}$$

In the above equation, the Pockels coefficient is $r_{33} = 30.8 \times 10^{-12}$ m/V or thereabouts in the case of LiNbO$_3$ having a refractive index $n_1 = 2.286$ (633 nm). If an electric field of 100 kV/cm is applied to the LiNbO$_3$, the refractive index will change by $2 \times 10^{-3}$. The maximum variation $\theta_{max}$ in the traveling direction of the laser beam is obtained at the critical angle of $\theta_T$ in the following manner.

$$\begin{aligned}\theta_{max} &= (90 - \theta_T) \times 2 = \{90 - \sin^{-1}(n_2/n_1)\} \times 2 \\ &= (90° - 87.60°) \times 2 = 2.40° \times 2 = 4.80°\end{aligned}$$

In the case of total reflection, it is necessary to change the angle of the total reflection plane with respect to the laser beam in order to deflect (scan) the laser beam. Therefore, the deflection (scanning) of the laser beam is not easy to carry out.

Figure 5:
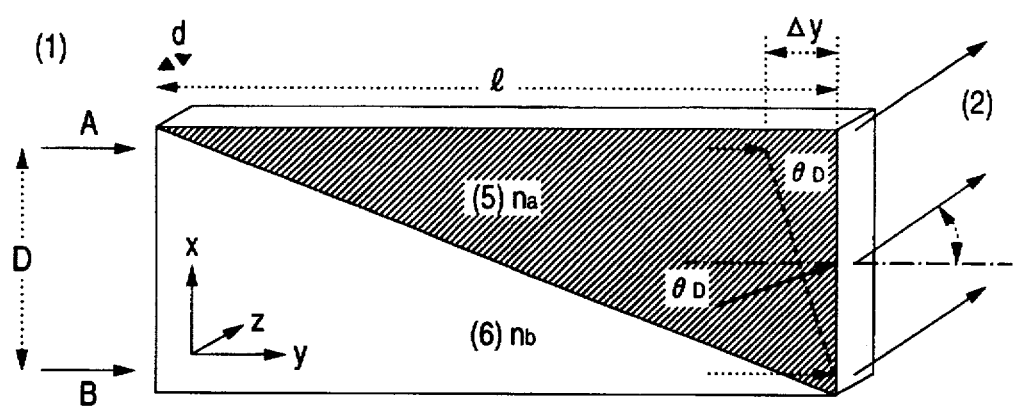
FIG. 5 is a schematic illustration showing the principle of a prism type deflecting device.

As shown in FIG. 5, a prism type optical deflecting device has also been known. With regard to FIG. 5, assume that a medium consists of two prisms 5 and 6 having a length "l", a height "D", and different refractive indices. Light "A" enters the medium passes through the prism 5 having a refractive index $n_a$. On the assumption that the light velocity in the prism 5 is $c_a$, the lapse of time $\tau_a$ during which the light passes through the prism 5 becomes $$\tau_a = l/c_a \quad (12)$$

Given that the velocity in the vacuum is "c", the lapse of time $\tau_a$ becomes $$\tau_a = l/c_a = l/c \cdot n_a \quad (13)$$

Similarly, the lapse of time $\tau_b$ during which light "B" passes through the prism 6 having a refractive index $n_b$ is given by $$\tau_b = l/c_b = l/c \cdot n_b \quad (14)$$

Accordingly, the difference in the lapse of time between the light A and the light B is represented by the following Equation (15) on the assumption that $n_a = n + \Delta n > n_b = n$, $$\Delta\tau = l/c \cdot (n_a - n_b) = l/c \cdot \Delta n \quad (15)$$

The positional difference between the wave fronts of the lights A and B before they outgo from the prism caused by the difference in the lapse of time is given by $$\Delta y = c_b \cdot \Delta\tau = c/n_b \cdot l/c \cdot \Delta n = l\Delta n/n \quad (16)$$

This positional difference corresponds to the refracted angle of the beam axis in the prism. The refracted angle of the beam axis is given by $$\theta_D = \tan(\theta_D) = -\Delta y/D = -l\Delta n/(Dn) \quad (17)$$

The angle at which the laser beam outgoes from the prism in accordance with Snell's law is given as below.

$$n_{air} \cdot \sin \theta_0 = \sin \theta_0 = n \cdot \sin \theta_D \quad (18)$$

Therefore, $$\begin{aligned}\theta_0 &= \sin^{-1}(n \cdot \sin\theta_D) \approx n \cdot \theta_D = -n \cdot l\Delta n/(Dn) \\ &= -l\Delta n/D\end{aligned}$$

On the assumption that the axes of polarization of these prisms are opposite to each other, and that an electric field is applied in the direction parallel to the Z axis, the following equations are obtained from Equation (9), that is, $\Delta n = -1/2 r n_0^3 E$.

$$n_a = n - 1/2 r n^3 E \quad (19)$$

$$n_b = n + 1/2 r n^3 E \quad (20)$$

From $\Delta n = n_a - n_b$, we have $$\Delta n = -r n^3 E \quad (21)$$

Therefore, assume that an applied voltage is V, and that the thickness of the prism is "d", we have $$\theta_0 = -l\Delta n/D = l/D \cdot m^3 E \quad (22)$$
$$= l/D \cdot m^3(V/d)$$

As a result, the laser beam can be deflected in proportion to the electric field or the voltage.

Suppose that triangular electrodes are arranged (on the front side and the back side) at the position of the prism (5) (the hatched portion) as shown in FIG. 5 instead of the two prisms, and that the electric field is applied in the direction parallel to the Z axis, then $$n_a = n - 1/2 \, m^3 E \quad (23)$$
$$n_b = n \quad (24)$$

From $\Delta n = n_a - n_b$, we have $$\Delta n = -1/2 m^3 E \quad (25)$$

Accordingly, suppose that an applied voltage is V, and that the thickness of the medium is "d", we have $$\theta_0 = -l\Delta n/D = l/D \cdot 1/2 m^3 E \quad (26)$$
$$= l/(2D) \cdot m^3(V/D)$$

If the refractive index is decreased in accordance with the Kerr effect, Equation (26) changes into the following Equation (27) using Equation (7)

$$\theta_0 = -l\Delta n/d = l/D \cdot 1/2 m^e E^2 \quad (27)$$
$$= l/(2D) \cdot m^e(V/d)^2$$

Bulk devices using a ceramic or a monocrystal have already been known as devices having the above described electro-optical effect. However, these conventional devices are bulky and require a considerably high driving voltage, which makes it impossible to achieve a practical deflection angle. The use of an optical deflecting device as shown in FIGS. 1(a) and 1(b), which comprises an optical waveguide 10 having polarization domain reversal areas 7, the optical waveguide being made of a Ti-diffused monocrystal LiNbO$_3$ or a proton-exchanged monocrystal LiNbO$_3$, has been studied. However, these devices must have a spacing of about 0.5 mm between the upper electrode 8 and the lower electrode 12, which corresponds to the thickness of the LiNbO$_3$ monocrystalline substrate 11a. For this reason, conventional devices still require a high driving voltage, which makes it impossible to achieve a practical deflection angle.

The present invention will be described in detail with reference to the following Embodiments, but the invention should not be construed as being limited thereto.

DETAILED DESCRIPTION OF THE PREFERRED EMBODIMENTS

First Embodiment

Figure 6:
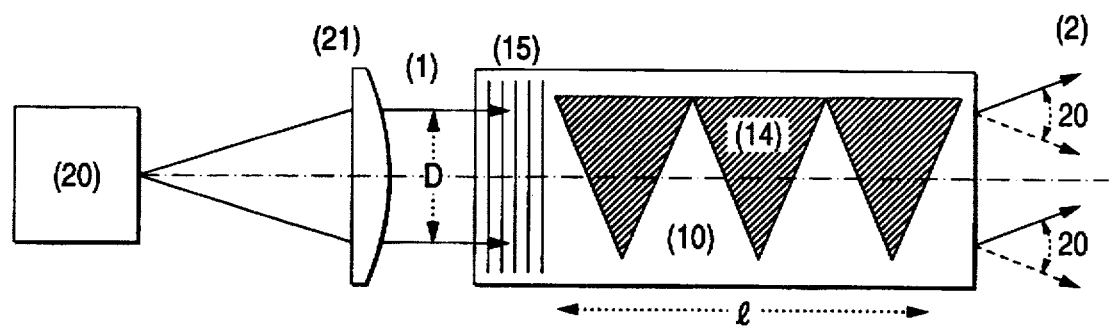
FIG. 6 is a top view of an optical deflecting device according to a first embodiment of the present invention.
Figure 7:
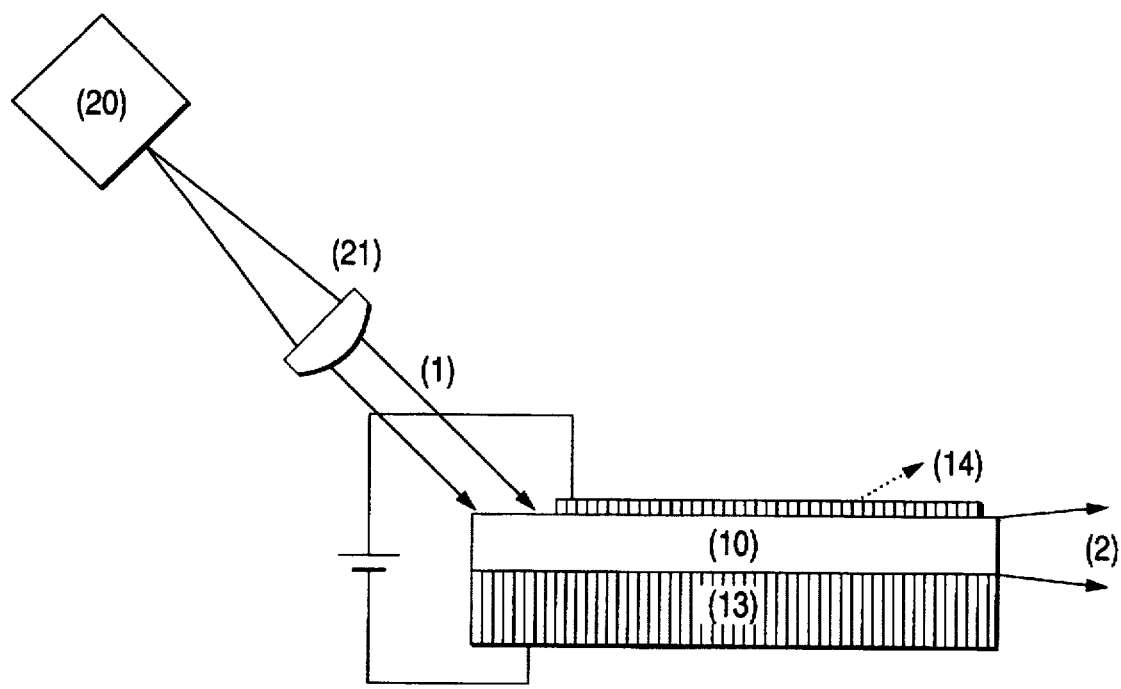
FIG. 7 is a cross-sectional view of the optical deflecting device of the first embodiment.
Figure 8:
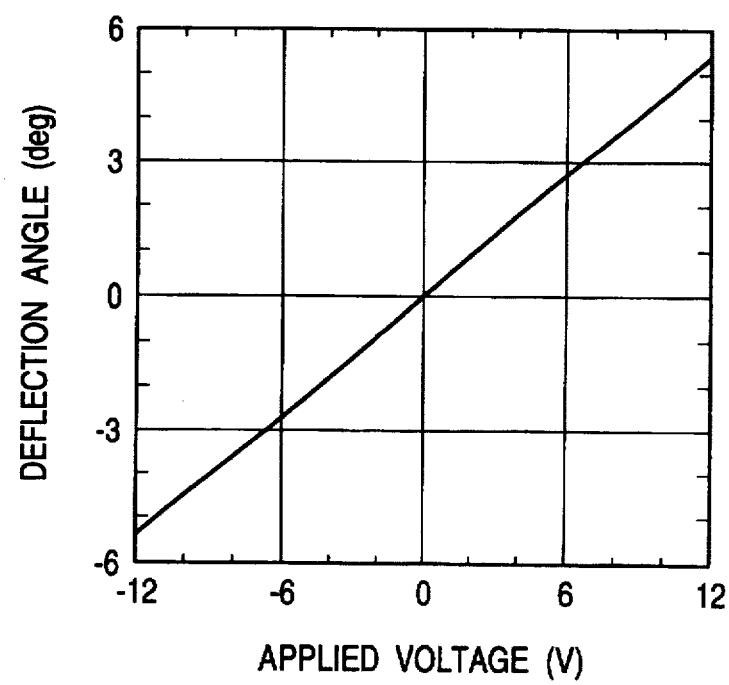
FIG. 8 is a plot showing the relationship between an applied voltage and a deflection angle with regard to the optical deflecting device of the first embodiment.

In the present embodiment, an epitaxial PLZT (12/40/60) thin-film optical waveguide 10 is grown on a Nb-doped SrTiO$_3$ (100) monocrystalline conductive substrate 13 having a specific resistance of about from 5 to 500 mΩ·cm, as shown in FIGS. 6 and 7. The PLZT layer having a thickness of d$_w$=600 nm, a relative permeability of $\epsilon_w$=1300, and a Pockels coefficient of r=120×10$^{-12}$ m/V is prepared by a solid-phase epitaxial growth using the sol-gel method. In the preparation, acetate anhydride Pb(CH$_3$COO)$_2$, lanthanum isopropoxide La(O-i-C$_3$H$_7$)$_3$, zirconium isopropoxide Zr(O-i-C$_3$H$_7$)$_4$, and titanium isopropoxide Ti(O-i-C$_3$H$_7$)$_4$, all being used as starting materials, are dissolved in 2-methoxyethanol. The solution is distilled for six hours, and the thus distilled solution is then subjected to reflux for 18 hours. Finally, a precursor solution for PLZT (12/40/60) having a Pb-concentration of 0.6M is obtained. The substrate 13 is spin-coated with this precursor solution. All of the above described operations are carried out in the atmosphere of N$_2$. Subsequently, the substrate is heated in a humid O$_2$ atmosphere at a rate of 10° C./sec. The substrate is maintained at a temperature of 350° C., and it is then maintained at a temperature of 650° C. Finally, the power of an electric furnace is turned off, so that the substrate is cooled. As a result, the first PLZT thin film layer is grown to a thickness of about 100 nm by a solid-phase epitaxial growth. The epitaxial PLZT thin film having a total thickness of 600 nm is manufactured by further repeating the above described growth of the PZT thin film five times. The thus obtained epitaxial PLZT thin film is provided with a crystallographic structure of PLZT(100)//Nb—SrTiO$_3$(100) and an in-plane orientation of PLZT[001]//Nb—SrTiO$_3$[001].

Three triangular electrode arrays 14, each having a bottom side of 3.3 mm and a height of 2.0 mm, are formed with an ITO transparent conductive oxide thin-film, which has a specific resistance of about 1 mΩ·cm and a thickness of about 100 nm, on the PLZT thin-film optical waveguide 10. A laser diode 20 having a wavelength of 780 nm and an output power of 20 mW is used as the light source, and light emitted from this light source is collimated into a laser beam having a width of 2 mm by means of a collimator lens 21. The thus collimated laser beam is introduced into the PLZT thin-film optical waveguide through a grating 15. The PLZT thin-film optical waveguide 10 has a larger refractive index than each of the ITO transparent conductive oxide thin film 14 and the Nb-doped SrTiO$_3$ (100) monocrystalline substrate 13. Accordingly, the incident laser beam 1 is confined within the PLZT thin-film optical waveguide 10. The incident laser beam 1 is deflected by applying a voltage between electrodes of the ITO thin-film triangular electrode arrays 14 and the Nb-doped SrTiO$_3$ monocrystalline electrode 13. The thus deflected laser beam outgoes from the end face of the optical waveguide 10. The outgoing laser beam 2 can be used in various applications, for example, the exposure of a photoreceptor after having passed through an optical system such as an F-θ lens.

The optical deflecting device of the present embodiment can be arranged so as to have n=2.50, r=120×10$^{-12}$ m/V, l=10 mm, D=2 mm, and d=600 nm in Equation (26). A deflection angle θ obtained at an applied voltage of 12 V is 5.4. The laser beam can be deflected over an angle range of 10.8° by sweeping the applied voltage from −12 V to +12 V. Thus, the practical deflection angle is achieved by means of a practical applied voltage.

COMPARATIVE EXAMPLE 1

Figure 2:
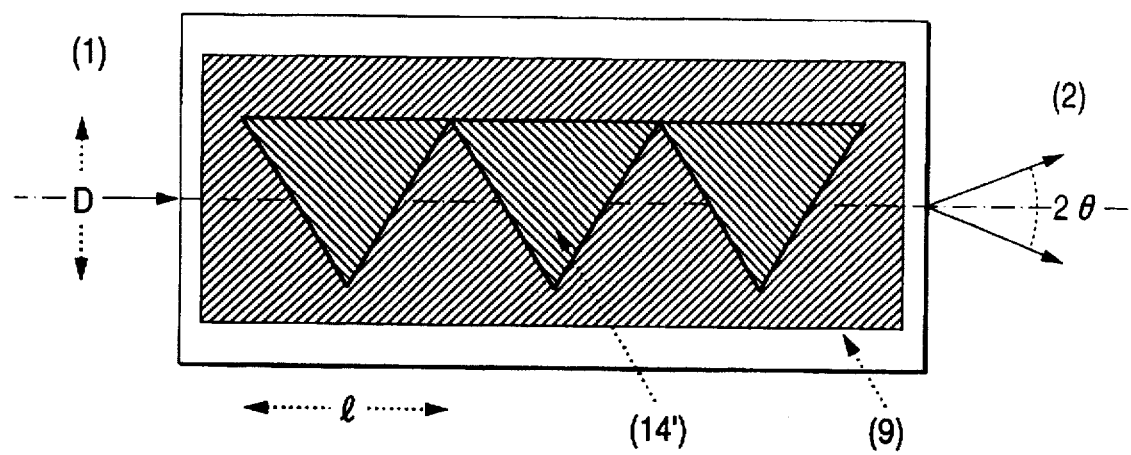
FIG. 2(a) is a top view of an optical deflecting device according to the comparative Example 1.
FIG. 2(b) is a cross-sectional view of the optical deflecting device of the comparative Example 1.
Figure 2:
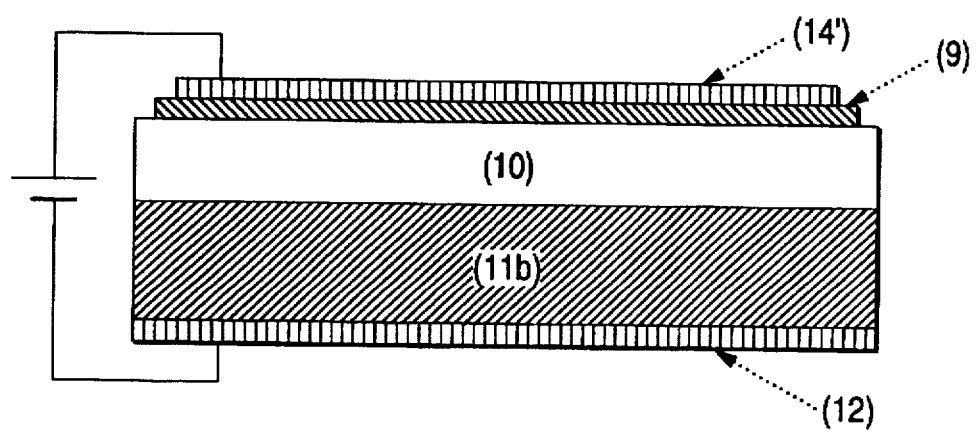

With reference to FIGS. 2(a) and 2(b), an epitaxial PLZT (12/40/60) thin-film optical waveguide 10 is grown on a MgO (100) monocrystalline substrate 11b. As with the first embodiment, the PLZT layer having a thickness of d$_w$=600 nm, $\epsilon_w$=1300, and r=120×10$^{-12}$ m/V is manufactured by a solid-phase epitaxial growth using the sol-gel method. The thus obtained epitaxial PLZT thin film is provided with a crystallographic structure of PLZT(100)//MgO(100) and an in-plane orientation of PLZT[001]//MgO[001].

Three triangular electrode arrays, each having a bottom side of 3.3 mm and a height of 2.0 mm, are formed as an upper electrode 14' which is made of an Al thin film having a thickness of about 100 nm. Between the upper electrode 14' and the PLZT thin-film optical waveguide, a $SiO_2$ cladding layer 9 having a thickness of about 200 nm is interposed to suppress the loss of the light traveling through the optical waveguide having metal electrodes. A laser diode having a wavelength of 780 nm and an output power of 20 mW is used as the light source. Light emitted from the light source is collimated into a laser beam having a width D=2 mm. The thus collimated laser beam is introduced into the PLZT thin-film optical waveguide through a grating. The incident laser beam is deflected by applying a voltage between the upper electrode 14' comprising the triangular electrode arrays and a lower electrode 12. The thus deflected laser beam outgoes from the end surface of the optical waveguide.

In the above described optical deflecting device, the thin-film optical waveguide is sandwiched between the cladding layer and an insulative substrate. Hence, it is impossible to directly apply to the optical waveguide an applied voltage V between the upper and lower electrodes. Only a part of the applied voltage V (an effective voltage $V_w$) is applied to the optical waveguide. Assume that the device comprises a buffer layer having a thickness $d_b$, an optical waveguide layer having a thickness $d_w$, a cladding layer having a thickness $d_c$, and that they respectively have dielectric constants $\epsilon_b$, $\epsilon_w$, and $\epsilon_c$, the applied voltage V in Equation (26) corresponds to the effective voltage $V_w$ as obtained below.

$$V_w = V \cdot (\epsilon_b \epsilon_c / d_b d_c) / (\epsilon_w \epsilon_c / d_w d_c + \epsilon_b \epsilon_w / d_b d_w + \epsilon_b \epsilon_c / d_b d_c) \quad (27)$$

Further, we have n=2.50, r=120×10⁻¹² m/V, l=10 mm, D=2 mm, $d_b$=200 nm, $\epsilon_b$=4, $d_w$=600 nm, $\epsilon_w$=1300, $d_c$=500 µm, and $\epsilon_c$=8.

Although the optical deflecting device uses the MgO substrate having a relatively small dielectric constant, an effective voltage $V_w$ of only $8.9 \times 10^{-5}$ V is applied to the optical waveguide even when a voltage of 12 V is applied. Consequently, the deflection angle θ is only $4.0 \times 10^{-5}$ degrees. Even if the applied voltage is swept from −12 V to +12 V, the resultant deflection angle θ is $8.0 \times 10^{-5}$ degrees. Neither the deflection angle nor the applied voltage is practical.

Second Embodiment

Figure 9:
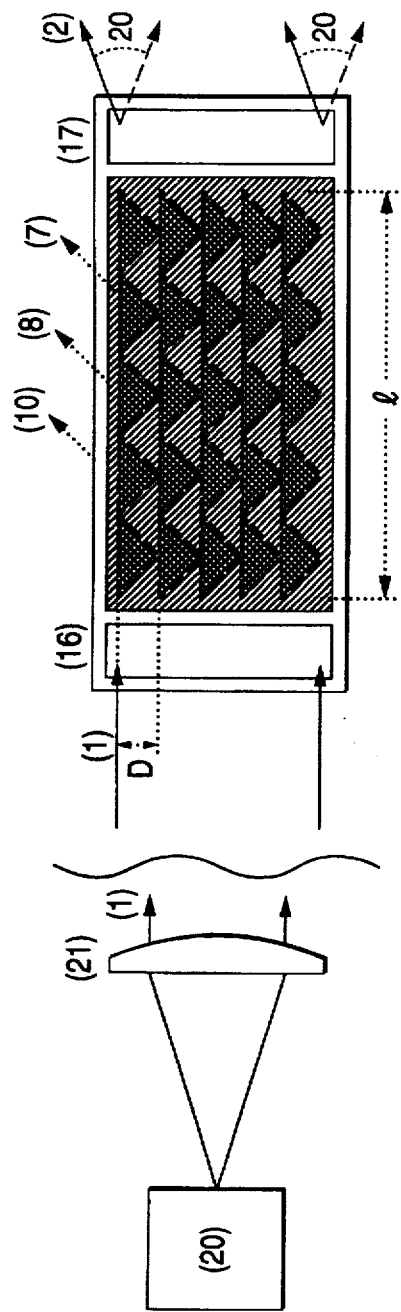
FIG. 9 is a top view of an optical deflecting device according to a second embodiment of the present invention.
Figure 10:
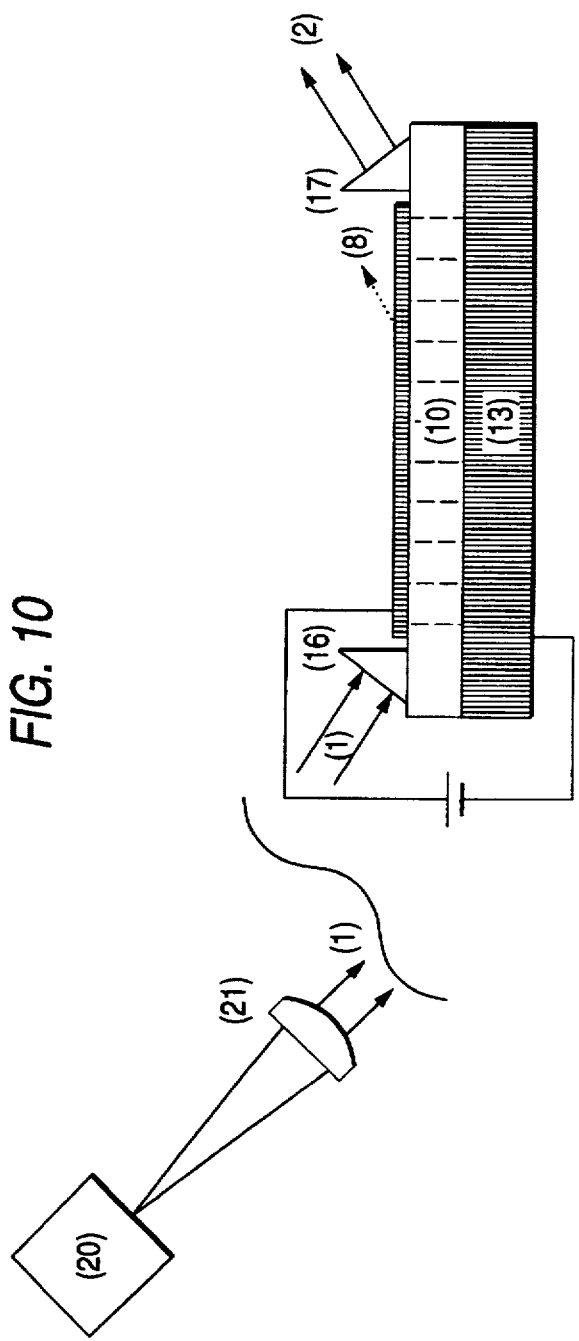
FIG. 10 is a cross-sectional view of the optical deflecting device of the second embodiment.

To enlarge the deflection angle obtained in the first embodiment, the second embodiment employs a polarized domain reversal prism array. As shown in FIGS. 9 and 10, the epitaxial PLZT (12/40/60) thin-film optical waveguide 10 is grown on the Nb-doped $SrTiO_3$ (100) monocrystalline substrate 13. The PLZT layer having a thickness of $d_w$=600 nm, $\epsilon_w$=1300, and r=120×10⁻¹² m/V is manufactured by a solid-phase epitaxial growth using the sol-gel method in the same manner as in the first embodiment. Twenty five prism-shaped polarization domain reversal areas 7, each having a bottom side of 2 mm and a height of 1.0 mm, are formed in the PLZT thin-film optical waveguide by applying a voltage using prism-shaped electrodes while heated to a temperature kept not less than its Curie temperature. After removing the prism-shaped electrode, an upper electrode 8 made of a ITO transparent conductive oxide thin film is formed on the PLZT thin-film optical waveguide to a thickness of about 100 nm. A laser diode 20 having a wavelength of 780 nm and an output power of 20 mW is used as the light source. Light emitted from the light source is collimated into a laser beam having a width D=5 mm by means of a collimator lens 21. The thus collimated laser beam is introduced into the PLZT thin-film optical waveguide through a prism 16 for coupling. The incident laser beam 1 is deflected by applying a voltage between the upper electrode 8 made of the ITO transparent conductive oxide thin film and the Nb-doped $SrTiO_3$ monocrystalline electrode 13. The thus deflected laser beam outgoes from the end surface of the optical waveguide through a prism 17.

Figure 13:
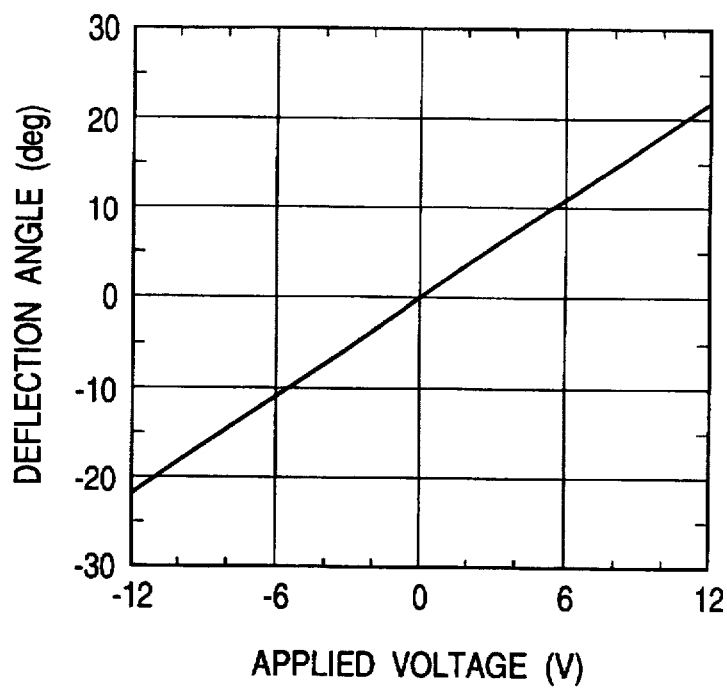
FIG. 13 is a plot showing the relationship between an applied voltage and a deflection angle with regard to the optical deflecting device of the second embodiment.

The optical deflecting device of the present embodiment can be arranged so as to have n=2.50, r=120×10⁻¹² m/V, l=10 mm, D=1 mm, and d=600 nm in Equation (22). A deflection angle θ obtained at an applied voltage of 12 V is 21.5, as shown in FIG. 13. The laser beam can be deflected over an angle of 43.0° by sweeping the applied voltage from −12 V to +12 V. Thus, the practical deflection angle is achieved by means of a practical applied voltage.

Third Embodiment

Figure 11:
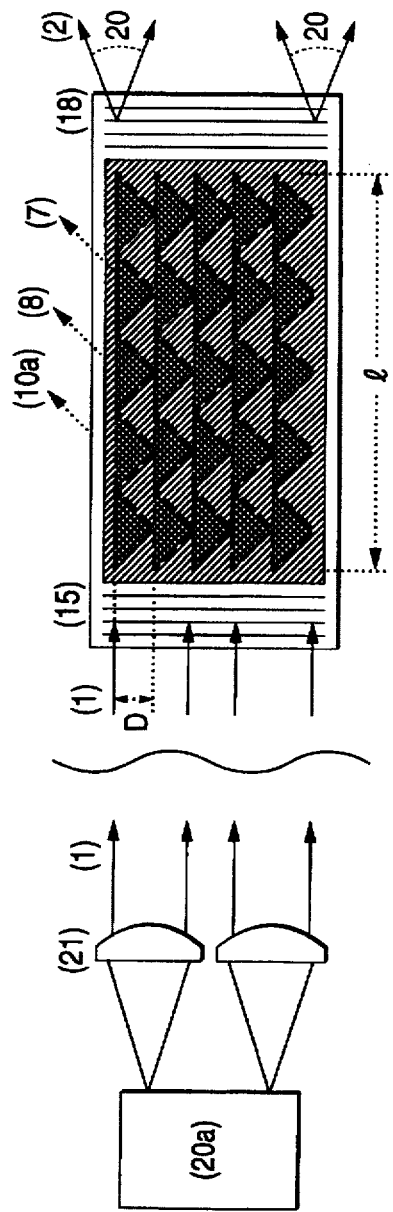
FIG. 11 is a top view of an optical deflecting device according to a third embodiment of the present invention.
Figure 12:
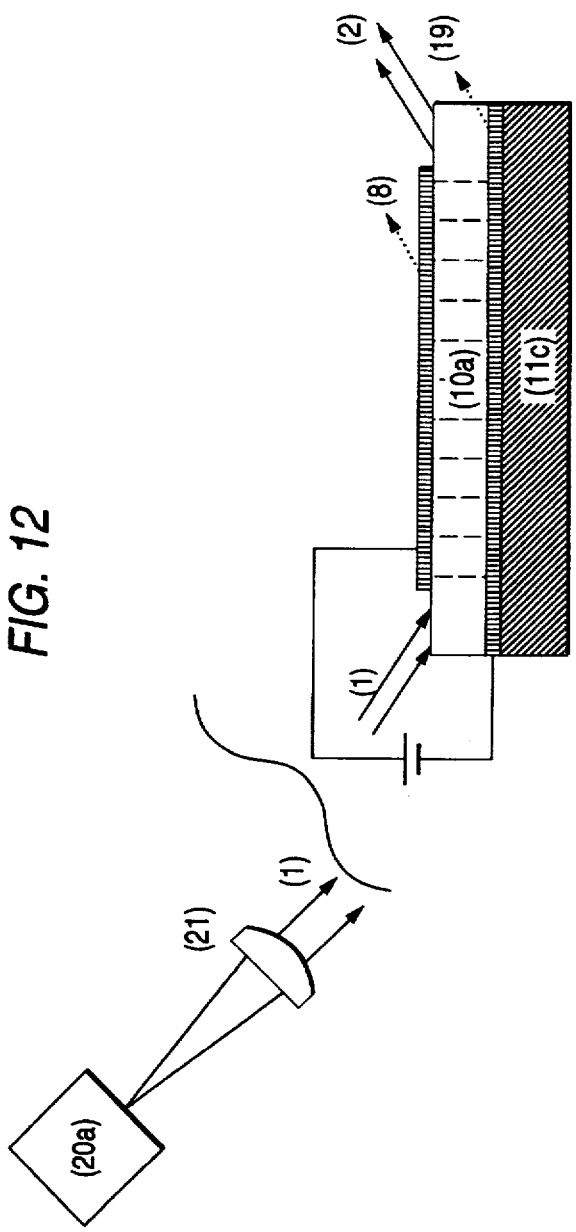
FIG. 12 is a cross-sectional view of the optical deflecting device of the third embodiment.

A (0001) high-oriented, Al-doped ZnO conductive thin film 19 having a specific resistance of about 1 mΩ·cm is grown on an insulative sapphire (0001) monocrystalline substrate 11c by Rf-magnetron sputtering, as shown in FIGS. 11 and 12. Further, a (0001) high-oriented $LiNbO_3$ thin-film optical waveguide 10a is grown on the (0001) high-oriented, Al-doped ZnO conductive thin film 19. The twenty five prism-shaped polarization domain reversal areas 7 each having a bottom side of 2 mm and a height of 1.0 mm, are formed in the $LiNbO_3$ thin-film optical waveguide 10a by subjecting the waveguide to a proton-exchange treatment with pyrophosphoric acid through a $SiO_2$ mask having prism-shaped apertures. After removing the mask, an upper electrode 8 made of an ITO transparent conductive oxide thin film is formed on the $LiNbO_3$ thin-film optical waveguide to a thickness of about 100 nm. The dual spot laser diode array 20a having a wavelength of 780 nm and an output power of 20 mW is used as a light source. Lights emitted from the light source is collimated into two laser beams having a width D=2 mm by means of the collimator lens 21. The thus collimated laser beams are introduced into the $LiNbO_3$ thin-film optical waveguide through the grating 15. The $LiNbO_3$ thin-film optical waveguide has a higher refractive index than each of the ITO transparent conductive oxide thin film and the Al-doped ZnO conductive thin film. For this reason, the laser beams are confined within the $LiNbO_3$ thin-film optical waveguide. By applying a voltage between the ITO electrode and the Al-doped ZnO electrode, the prism-shaped domain reversal areas and the other areas of the $LiNbO_3$ thin-film optical waveguide are made to have different refractive indices from each other, whereby the incident laser beams are deflected. The deflected two laser beams outgo the optical waveguide through a grating 18.

Figure 14:
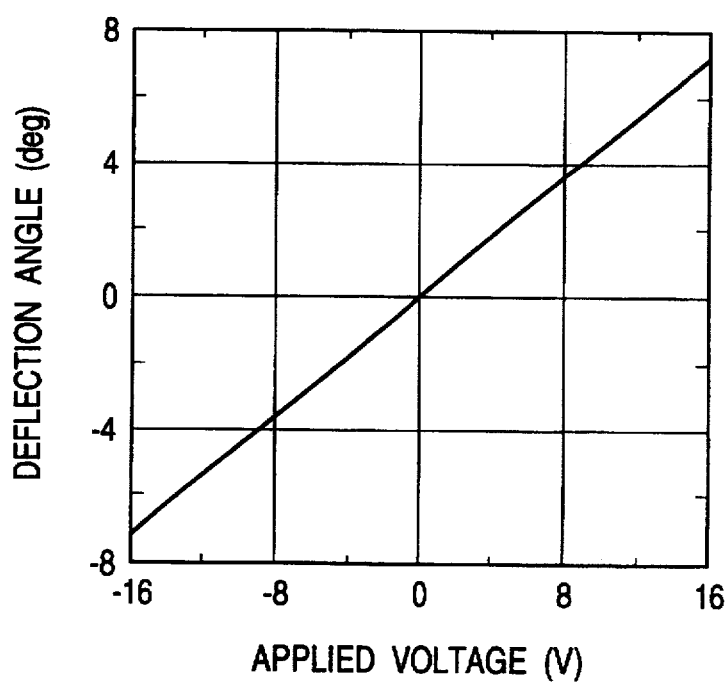
FIG. 14 is a plot showing the relationship between an applied voltage and a deflection angle with regard to the optical deflecting device of the third embodiment.
Figure 15:
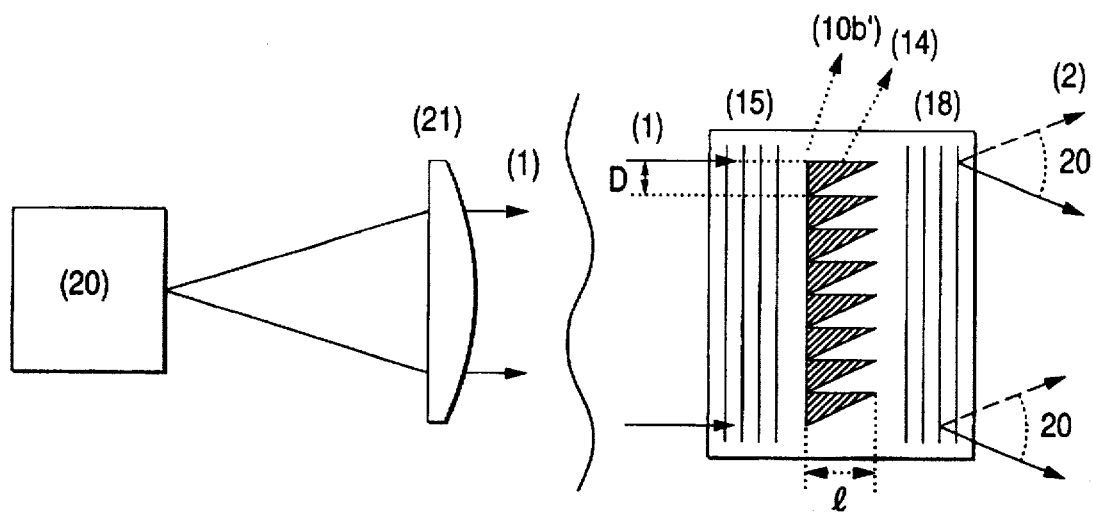
FIG. 15 is a top view of an optical deflecting device according to a fourth embodiment of the present invention.
Figure 16:
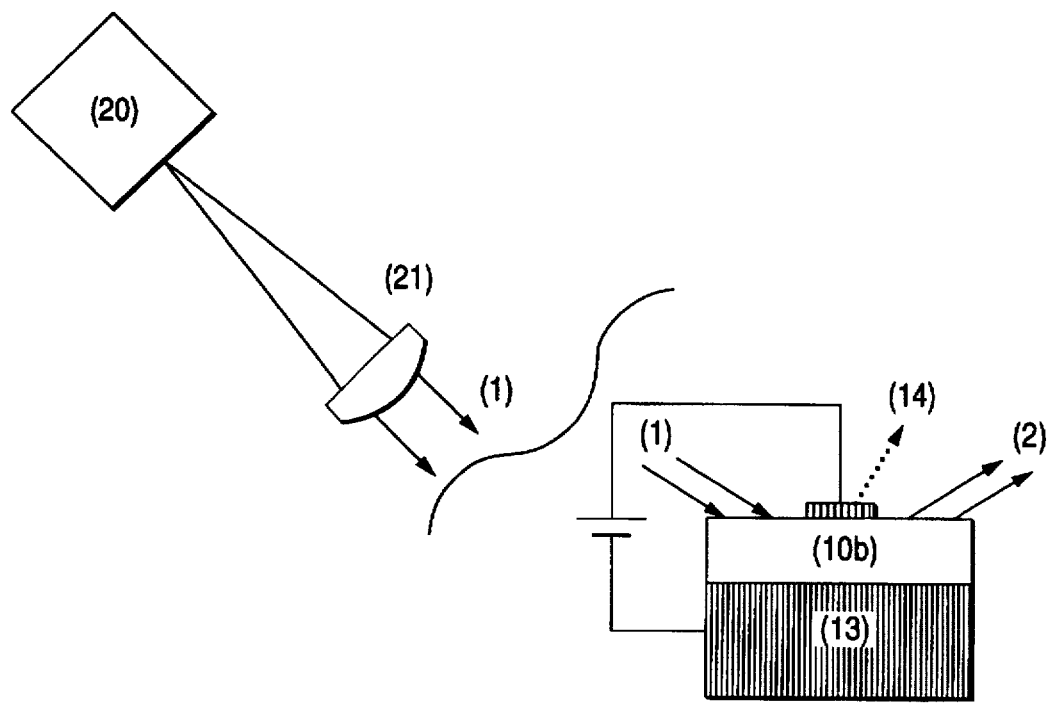
FIG. 16 is a cross-sectional view of the optical deflecting device of the fourth embodiment.

The optical deflecting device of the present embodiment can be arranged so as to have n=2.18, r=30×10⁻² m/V, l=10 mm, D=1 mm, and d=400 nm in Equation (22). A deflection angle θ obtained at an applied voltage of 16 V is 7.1, as shown in FIG. 14. The laser beam can be deflected over an angle of 14.2° by sweeping the applied voltage from −16 V to +16 V. Thus, the practical deflection angle is achieved by means of a practical applied voltage.

Fourth Embodiment

Contrary to the first to third embodiments which utilize the Pockels effect, a PLZT (8.5/65/35) which exhibits the Kerr effect is used in this fourth embodiment. An epitaxial PLZT (8.5/65/35) thin-film optical waveguide 10b having a thickness of $d_W=500$ nm, $\epsilon_W=1300$, and $R=3860\times10^{-18}$ m$_2$/V$_2$ is manufactured on a Nb-doped SrTiO$_3$ (100) monocrystalline conductive substrate 13 having a specific resistance of from 5 to 500 mΩ·cm, by a solid-phase epitaxial growth using the sol-gel method in the same manner as in the first embodiment. The thus obtained epitaxial PLZT thin film is provided with a crystallographic structure of PLZT (100)//Nb—SrTiO$_3$(100) and an in-plane orientation of PLZT[001]//Nb—SrTiO$_3$[001].

The eight triangular electrode arrays 14, each having a bottom side of 1.0 mm and a height of 2.0 mm, are formed with an ITO transparent conductive oxide thin film having a specific resistance of about 1 mΩ·cm and a thickness of about 100 nm, on the PLZT thin-film optical waveguide 10b. The laser diode 20 having a wavelength of 780 nm and an output power of 20 mW is used as the light source. Light emitted from the light source is collimated into a laser beam having a width D=8 mm by means of the collimator lens 21. The thus collimated laser beam is introduced into the PLZT thin-film optical waveguide through the grating 15. The PLZT thin-film optical waveguide has a higher refractive index than each of the ITO transparent conductive oxide thin film and the Nb-doped SrTiO$_3$ (100) monocrystalline substrate. For this reason, the laser beam 1 is confined within the PLZT thin-film optical waveguide. The incident laser beam 1 is deflected by applying a voltage between the ITO thin-film triangular electrode array 14 and the Nb-doped SrTiO$_3$ monocrystalline electrode 13. The thus deflected laser beam outgoes from the end face of the optical waveguide. The outgoing laser beam can be used in various applications, for example, the exposure of a photoreceptor after having passed through an optical system such as an F·θ lens.

Figure 17:
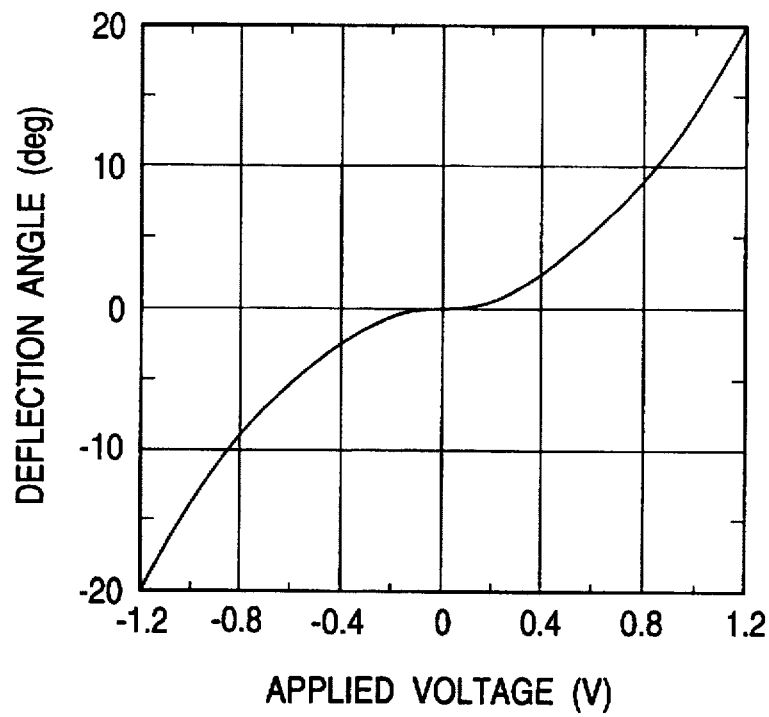
FIG. 17 is a plot showing the relationship between an applied voltage and a deflection angle of the optical deflecting device of the fourth embodiment.
Figure 18:
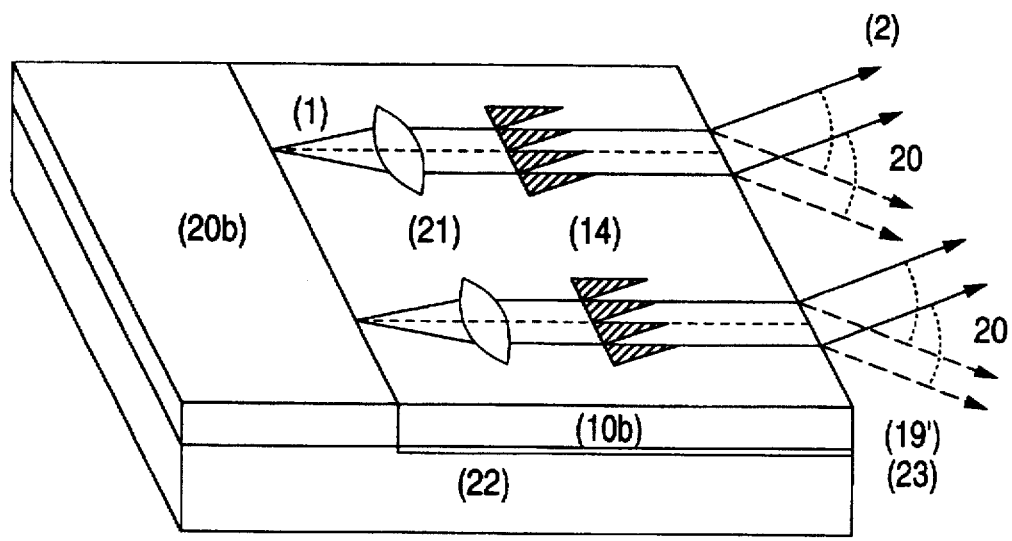
FIG. 18 is a perspective view of an optical deflecting device according to a fifth embodiment of the present invention.

The optical deflecting device of the present embodiment can be arranged so as to have n=2.50, R=3860×10$^{-18}$ m$^2$/V$^2$, l=2 mm, D=1 mm, and d=500 nm in Equation (27). A deflection angle θ obtained at an applied voltage of 1.2 V is 20°, as shown in FIG. 17. The laser beam can be deflected over an angle of 40° by sweeping the applied voltage from −1.2 V to +1.2 V, as shown in FIG. 17. Thus, the practical deflection angle is achieved by means of a practical applied voltage.

Fifth Embodiment

The PLZT (8.5/65/35) which exhibits the Kerr effect is grown on a semiconductor laser substrate GaAs 22 in the same manner as in the fourth embodiment. A semiconductor laser 20b is manufactured by growing a multilayer AlGaAs using the MOCVD method, and by diffusing Si into the areas which do not act as a laser cavity. A MgO buffer layer 23 is grown on the GaAs 22, and a Nb-doped SrTiO$_3$ (100) conductive thin film 19' having a specific resistance of about from 5 to 500 mΩ·cm is grown on the MgO buffer layer 23, both by means of the laser abrasion method. The epitaxial PLZT (8.5/65/35) thin-film optical waveguide 10b having a thickness of $d_W=500$ nm, $\epsilon_W=1300$, and $R=3860\times10^{-18}$ m$_2$/V$_2$ is manufactured on a Nb-doped SrTiO$_3$(100) conductive thin film 19' by a solid-phase epitaxial growth using the sol-gel method in the same manner as in the first embodiment. The thus obtained epitaxial PLZT thin film is provided with a crystallographic structure of PLZT(100)//Nb—SrTiO$_3$(100) and an in-plane orientation of PLZT[001]//GaAs[100].

The eight triangular electrode arrays 14 each having a bottom side of 1.0 mm and a height of 2.0 mm are formed with an ITO transparent conductive oxide thin film having a specific resistance of about 1 mΩ·cm and a thickness of about 100 nm, on the PLZT thin-film optical waveguide 10b. The dual spot laser diode 20b having a wavelength of 780 nm and an output power of 20 mW is used as the light source. After having been directly introduced into the PLZT thin-film optical waveguide from its end face, lights emitted from the light source are collimated into laser beams each having a width D=2 mm by means of the collimator lens 21. After having been collimated, the laser beam 1 is deflected by applying a voltage between the ITO thin-film triangular electrode array 14 and the Nb-doped SrTiO$_3$ monocrystalline electrode 19'. The thus deflected laser beam outgoes from the end face of the optical waveguide. The outgoing laser beam can be used in various applications, for example, the exposure of a photoreceptor after having passed through an optical system such as an F·θ lens. Similarly as in the fourth embodiment, the practical deflection angle is achieved by the practical applied voltage.

The present invention is directed to an optical waveguide deflecting device which can carry out high-speed modulation utilizing the electro-optical effect. According to the present invention, the deflection angle of the laser beam is enlarged, and the driving voltage and the applied voltage are significantly reduced. Compared to a conventional optical deflecting device having movable parts, the optical deflecting device of the present invention can be made more compact, inexpensive, highly efficient, speedy, and noiseless. Therefore, the optical deflecting device of the present invention can be used in a broad range of optoelectronics; for example, it can be used as a laser optical deflecting device for use in laser printers, digital copiers, and facsimile machines, a pick-up for use with optical disks, or an optical switch for use in optical communications or optical computers.

While the invention has been described in detail and with reference to specific Embodiments thereof, it will be apparent to one skilled in the art that various changes and modifications can be made therein without departing from the spirit and scope thereof.

What is claimed is:

1. An optical deflecting device comprising:

a conductive or semi-conductive monocrystalline substrate comprising a surface;

an optical waveguide comprising an epitaxial or oriented ferroelectric film provided on the surface of the monocrystalline substrate, the optical waveguide comprising a surface; and an upper electrode disposed on the surface of the optical waveguide;

wherein the optical waveguide has at least one prism-shaped polarization domain reversal area having two sides which are not parallel to each other, and the at least one prism-shaped polarization domain reversal area is made to have a different refractive index from that of the other area of the optical waveguide by applying a voltage between the upper electrode and the monocrystalline substrate.

2. The optical deflecting device as claimed in claim 1, wherein the optical waveguide has only one prism-shaped polarization domain reversal area arranged therein.

3. The optical deflecting device as claimed in claim 1, wherein the optical waveguide has a plurality of prism-shaped polarization domain reversal areas arranged therein.

4. The optical deflecting device as claimed in claim 1, wherein the upper electrode has a prism-shaped pattern having two sides which are not parallel to each other, and the area of the optical waveguide covered with the upper electrode is made to have a different refractive index from that of the other area of the optical waveguide by applying a voltage between the upper electrode and the monocrystalline substrate.

5. The optical deflecting device as claimed in claim 1, wherein the conductive or semi-conductive monocrystalline substrate comprises an oxide having a refractive index smaller than that of the optical waveguide.

6. The optical deflecting device as claimed in claim 1, further comprising a cladding layer interposed between the upper electrode and the optical waveguide, the cladding layer having a refractive index smaller than that of the optical waveguide.

7. The optical deflecting device as claimed in claim 1, wherein the upper electrode comprises an oxide having a refractive index smaller than that of the optical waveguide.

8. The optical deflecting device as claimed in claim 1, further comprising:

a light source for emitting a laser beam; and coupling means for introducing the laser beam into the optical waveguide.

9. The optical deflecting device as claimed in claim 8, wherein the light source comprises one or plural lasers which emit one or plural laser beams, or comprises a laser array which oscillates plural laser beams.

10. The optical deflecting device as claimed in claim 8, wherein the light source is formed on the monocrystalline substrate.

11. An optical deflecting device comprising:

a monocrystalline substrate having thereon a conductive or semi-conductive, epitaxial or oriented film comprising a surface;

an optical waveguide comprising an epitaxial or oriented ferroelectric film provided on the surface of the conductive or semi-conductive, epitaxial or oriented film, the optical waveguide comprising a surface; and an upper electrode disposed on the surface of the optical waveguide;

wherein the optical waveguide has at least one prism-shaped polarization domain reversal area having two sides which are not parallel to each other, and the at least one prism-shaped polarization domain reversal area is made to have a different refractive index from that of the other area of the optical waveguide by applying a voltage between the upper electrode and the monocrystalline substrate.

12. The optical deflecting device as claimed in claim 11, wherein the optical waveguide has only one prism-shaped polarization domain reversal area arranged therein.

13. The optical deflecting device as claimed in claim 11, wherein the optical waveguide has a plurality of prism-shaped polarization domain reversal areas arranged therein.

14. The optical deflecting device as claimed in claim 11, wherein the upper electrode has a prism-shaped pattern having two sides which are not parallel to each other, and the area of the optical waveguide covered with the upper electrode is made to have a different refractive index from that of the other area of the optical waveguide by applying a voltage between the upper electrode and the monocrystalline substrate.

15. The optical deflecting device as claimed in claim 11, wherein the conductive or semi-conductive, epitaxial or oriented film provided on the monocrystalline substrate comprises an oxide having a refractive index smaller than that of the optical waveguide.

16. The optical deflecting device as claimed in claim 11, further comprising a cladding layer interposed between the upper electrode and the optical waveguide, the cladding layer having a refractive index smaller than that of the optical waveguide.

17. The optical deflecting device as claimed in claim 11, wherein the upper electrode comprises an oxide having a refractive index smaller than that of the optical waveguide.

18. The optical deflecting device as claimed in claim 11, further comprising:

a light source for emitting a laser beam; and coupling means for introducing the laser beam into the optical waveguide.

19. The optical deflecting device as claimed in claim 18, wherein the light source comprises one or plural lasers which emit one or plural laser beams, or comprises a laser array which oscillates plural laser beams.

20. The optical deflecting device as claimed in claim 18, wherein the light source is formed on the monocrystalline substrate.

* * * * *